United States Patent
Dura et al.

(10) Patent No.: US 10,853,682 B2
(45) Date of Patent: Dec. 1, 2020

(54) METHOD FOR PROCESSING AN IMAGE SHOWING A STRUCTURED DOCUMENT COMPRISING A VISUAL INSPECTION ZONE FROM AN AUTOMATIC READING ZONE OR OF BARCODE TYPE

(71) Applicant: IDEMIA IDENTITY & SECURITY FRANCE, Issy les Moulineaux (FR)

(72) Inventors: Jeremy Nicolas Laurent Dura, Issy les Moulineaux (FR); Laurent Rostaing, Issy les Moulineaux (FR); Thibault Berger, Issy les Moulineaux (FR)

(73) Assignee: IDEMIA IDENTIFY & SECURITY FRANCE, Issy les Moulineaux (FR)

( * ) Notice: Subject to any disclaimer, the term of this patent is extended or adjusted under 35 U.S.C. 154(b) by 58 days.

(21) Appl. No.: 16/028,243

(22) Filed: Jul. 5, 2018

(65) Prior Publication Data
US 2019/0012558 A1    Jan. 10, 2019

(30) Foreign Application Priority Data
Jul. 4, 2017   (FR) ...................................... 1756290

(51) Int. Cl.
*G06K 9/34*   (2006.01)
*G06K 9/00*   (2006.01)
(Continued)

(52) U.S. Cl.
CPC ........... *G06K 9/344* (2013.01); *G06K 7/1408* (2013.01); *G06K 7/1443* (2013.01);
(Continued)

(58) Field of Classification Search
CPC ........................ G06K 9/00483; G06K 2209/01
See application file for complete search history.

(56) References Cited

U.S. PATENT DOCUMENTS

2004/0081332 A1*  4/2004  Tuttle ................. G06K 9/00442
                                                    382/100
2006/0101327 A1   5/2006  Mandelbaum et al.
(Continued)

FOREIGN PATENT DOCUMENTS

FR    1559476    3/1969
GB    1156459 A  6/1969

OTHER PUBLICATIONS

Kwon et al., "Verification of the Document Components from Dual Extraction of MRTD Information", Sep. 20, 2007, Graphics Recognition, Recent Advances and New Opportunities, Lecture Notes in Computer Science, Springer Berlin Heidelberg, Berlin, Heidelberg, pp. 235-244. (Year: 2007).*
(Continued)

*Primary Examiner* — Ross Varndell
(74) *Attorney, Agent, or Firm* — Womble Bond Dickinson (US) LLP

(57) ABSTRACT

A method for processing an acquired image (IA) showing a structured personal document (D) including a visual inspection zone (VIZ). The method includes determination of a first character string from an automatic reading zone or of barcode type (MRZ) of predetermined format, the first character string representing personalised information specific to the owner of the document (D), generation from the first character string of an intermediate image (IS) showing a second character string representing the same personalised information, detection in the acquired image of a third character string in the visual inspection zone (VIZ), representing the same personalised information, the detection comprising an overall comparison of the intermediate image (IS) with the acquired image, location in the visual inspection zone (VIZ) of a region of interest containing the third character string.

13 Claims, 10 Drawing Sheets

(51) Int. Cl.
- *G06K 7/14* (2006.01)
- *G06K 9/32* (2006.01)
- *G06K 9/20* (2006.01)
- *G06K 9/68* (2006.01)

(52) U.S. Cl.
CPC ..... *G06K 9/00449* (2013.01); *G06K 9/00456* (2013.01); *G06K 9/2054* (2013.01); *G06K 9/3233* (2013.01); *G06K 9/6828* (2013.01)

(56) References Cited

U.S. PATENT DOCUMENTS

| | | | | |
|---|---|---|---|---|
| 2012/0226600 A1* | 9/2012 | Dolev | ................ | G06K 9/6203 705/38 |
| 2014/0279516 A1* | 9/2014 | Rellas | ................ | G06Q 30/0185 705/44 |

OTHER PUBLICATIONS

Vaudenay et al., "About machine-readable travel documents", Journal of Physics: Conference Series, Institute of Physics Publishing, Bristol, GB, vol. 77, No. 1, 2007, p. 12006 (10 pages).

Preliminary Research Report and Written Opinion received for French Application No. 1756290, dated Mar. 13, 2018, 12 pages (1 page of French Translation Cover Sheet and 11 pages of original document).

Lee et al., "Segmentation-free Word Spotting Using SIFT", Image Analysis and Interpretation (SSIAI), 2012 IEEE Southwest Symposium ON, IEEE, 2012, pp. 65-68.

Kwon et al., "Verification of the Document Components from Dual Extraction of MRTD Information", Sep. 20, 2007, Graphics Recognition, Recent Advances and New Opportunities, Lecture Notes in Computer Science, Springer Berlin Heidelberg, Berlin, Heidelberg, pp. 235-244.

\* cited by examiner

METHOD FOR PROCESSING AN IMAGE SHOWING A STRUCTURED DOCUMENT COMPRISING A VISUAL INSPECTION ZONE FROM AN AUTOMATIC READING ZONE OR OF BARCODE TYPE

FIELD OF THE INVENTION

The present invention relates to a method and device for processing an image showing a structured personal document comprising a visual inspection zone.

PRIOR ART

Structured personal documents are known, comprising an automatic reading zone and a visual inspection zone (VIZ).

The automatic reading zone can be typically a Machine-Readable Zone MRZ, a barcode and/or a chip. The automatic reading zone comprises information arranged and coded as predetermined and whereof at least one some is personal information, intended to be read and interpreted automatically by an automatic reading analysis system such as an image analysis system or a chip reader.

By contrast, a VIZ comprises non-coded information to be inspected by sight by any person, whereof at least one part is standardized information and identical for all documents of the same type (such as field labels).

These two zones are found in some passports for example, qualified as machine-readable passports. The MRZ of such passports contains personal information of the legal holder of the passport (his name, date of birth, etc.) coded in a predetermined format. Verification of the content of the MRZ by an image-analysis system configured to decode the predetermined format is much faster than verification of the content of the visual inspection zone of the passport by a human being.

However, the predetermined format of a MRZ is subject to constraints especially of size, such that some information, appearing completely in the visual inspection zone, can be absent in the MRZ or appear incomplete only.

Also, some image-analysis systems are not confined to analysing the personalised content of the automatic reading zone (MRZ, barcodes, chips etc.), but also analyse the content of the visual inspection zone VIZ whereof some of the content is specific and redundant for the same type of document.

Analysing the content of a visual inspection zone VIZ is a complex process. A system operating such analysis must in fact not only be capable of locating characters in this visual inspection zone VIZ, but also be capable of understanding their meaning to them usefully in later processing. For example, the character string "MARTIN" can designate both a first name and a family name.

The document "Verification of the Document Components from Dual Extraction of MRTD Information", by Young-Bin Kwon et al., proposes implementing character recognition (OCR) both in an MRZ and also in a visual inspection zone of a passport based on knowledge of its structure and the standardisation of the location of characters, then comparing the two strings obtained on completion of these character recognitions. However, these steps for character recognition can produce errors and lack precision, for example in the case of an image of reduced quality, having low contrasts or perspective, or in the event where the document is not perfectly perpendicular to the optical axis of the lens of the optical device used.

Also, methods comprising a comparison of an acquired image showing a structured document with a reference image of a model associated with the structured document are known.

The comparison between the acquired image and a reference image showing such a model is for example executed by an image-processing device for authentication purposes of the structured document.

The reference image must be previously stored in a database to which the image-processing device must have access.

The model contains predetermined regions of interest containing generic information, in the sense where this information is on any sample of structured document of a given type.

However, such a model does not always contain regions sufficiently rich in information for making a correct authentication.

Also, if no reference image showing a model associated with a structured document is available in the database, no comparison can be made. And even if many different reference images were stored in the database, so as to cover a wide variety of types of structured documents, nothing guarantees that this database is exhaustive.

SUMMARY OF THE INVENTION

An aim of the invention is to analyse the content of a visual inspection zone of a structured personal document automatically, simply, advantageously in terms of load calculation while reinforcing the reliability of the analysis.

Another aim of the invention is to analyse the content of a visual inspection zone of a structured personal document irrespective of the structure of the latter and without prior information as to this structure.

Another aim of the invention is to authenticate a structured personal document by means a device not having available reference images likely to serve as model for this structured document.

According to a first aspect of the invention, a method for processing an acquired image showing a structured personal document belonging to an owner is therefore proposed, the structured personal document comprising a visual inspection zone, the method comprising steps of:

determination of a first character string from an automatic reading zone or of barcode type having a predetermined format and being different to the visual inspection zone, the first character string representing at least one portion of a personalised information specific to the owner of the structured document, generation, from the first character string determined, of an intermediate image showing a second character string representing the same portion of personalised information, detection in the acquired image of a third character string contained in the visual inspection zone, the third character string representing at least one portion of the same personalised information, the detection comprising a comparison of the intermediate image with a portion of the acquired image in the visual inspection zone, location in the visual inspection zone of a region of interest of the acquired image containing the third character string.

The automatic reading zone or of barcode type has a predetermined format. As a consequence, it is easy to take note of the meaning of the first character string determined from this automatic reading zone or of barcode type. For example, it is very easy to know whether the character string "MARTIN" to be determined from an automatic reading zone or of barcode type designates a name or a first name. By way of non-limiting example, in an automatic reading zone whereof the predetermined format complies with document OACI/ICAO 9303 supplied by the International Civil Aviation Organisation or else that defined in the standard ISO/CEI 7501-1:2008, names and first names are separated by two chevrons while different names or different first names are separated by a single chevron.

During the execution of the method according to the first aspect of the invention, a character string having a given meaning can be found easily since the detection step is based on the first character string which has been determined in advance by the automatic reading zone or of barcode type. Such detection is much simpler to carry out than a technique confined to analyse the content of the visual inspection zone and input its meaning without information a priori. In this respect, the overall comparison executed between the intermediate image generated with the content of the visual inspection zone shown in the acquired image is a process particularly simple to execute.

Also, comparison of images between the intermediate image and the portion of the acquired image analyses varied images very reliably, which can exhibit perspective, low contrasts or reduced quality, especially relative to comparison involving recognition of character strings.

Such processing can be carried out without any prior knowledge of the structure or of the type of the structured personal document.

In definitive terms, as the third character string detected in the visual inspection zone has the same meaning as the first character string, on completion of the method a region of interest is produced having a content whereof the meaning in the visual inspection zone can be known. This can be exploited usefully in various applications.

The proposed method can comprise the following characteristics, taken singly or in combination when this is technically possible.

The first character string can be extracted from an extraction image showing the automatic reading zone or of barcode type, of the first character string, the first character string being contained in the automatic reading zone or of barcode type.

As a variant, the structured personal document can comprise an electronic chip storing the first character string. In this case, determination of the first character string comprises extraction, from an extraction image showing the automatic reading zone or of barcode type, of access data to the electronic chip contained in the automatic reading zone or of barcode type, and access to the first character string stored in the electronic chip by means of extracted access data.

The automatic reading zone or of barcode type can form part of the structured personal document to be processed. In this case, the invention advantageously builds on redundancy of information in this document for locating the region of interest of the visual inspection zone. This simplifies the execution of the method. It is however possible in other variant embodiments to use the automatic reading zone or of barcode type of another structured personal document belonging to the same owner.

In particular, the extraction image can be the acquired image where detection is executed. A single image showing the structured personal document is then required to locate the region of interest of the visual inspection zone. This considerably simplifies the execution of the method.

The method can comprise also determination of a font used in the visual inspection zone to represent the portion of personalised information; the intermediate image can be generated so as to show the second character string in the determined font. This makes detection of the third character string more reliable, and in particular detection lacking because the font used in the visual inspection zone of the structured personal document being processed is exotic.

In particular, it is possible to determine the font by means of the following sub-steps:
 extraction of information from the automatic reading zone or of barcode type,
 searching in a database for a font associated with the extracted information.

Because of these sub-steps, the same method is advantageously utilisable for processing structured documents of personal character of the same type but wherein different fonts are used (for example two identity documents issued by different countries).

Also, the method can comprise the determination of a display format used in the visual inspection zone to represent the portion of personalised information; the generation of the intermediate image can comprise the transcoding of the first character string to the determined display format. This transcoding is also such as to make detection of some personalised information more reliable, such as dates, for which several formats are possible.

Also, the first character string can represent only a first portion of the personalised information. A complementary character string representing another portion of the personalised information can be detected near the third character string detected in the acquired image. The region of interest of the acquired image located can be extended to the complementary character string. This complementary detection advantageously leads to particularly long complete information which could not feature fully in an automatic reading zone (this is the case for example for multiple first names or particularly long family names).

The method can also comprise steps of:
 detection, on the basis of the predetermined format of the automatic reading zone or of barcode type, of the meaning of the personalised information,
 selection, in a database of reference images showing models of structured documents, of a reference image as a function of the meaning of the personalised information and as a function of the placement and/or dimensions of the located region of interest.

The method can also comprise creation or updating of a reference image showing a model associated with the structured personal document, the creation or updating comprising the inclusion of the region of interest of the acquired image in the reference image.

The method can also comprise application of a video tracking algorithm confined to the located region of interest in the acquired image, so as to selectively monitor the content of the region of interest in a video sequence comprising the acquired image.

The method can also comprise authentication of the structured personal document as a function of the content of the located region of interest.

The method can also comprise the executed of a character recognition in the located region of interest.

The method can also comprise:
 repetition of the generation step from the first character string determined so as to obtain several intermediate images showing the second character string representing the same portion of personalised information but under different predetermined representations, repetition of the detection and location steps for each intermediate image generated, for each intermediate image, estimation of a matching index between the intermediate image and the located region of interest, selection of the intermediate image for which a maximal matching index has been estimated from the estimated matching indices, execution of the character recognition step selectively in the located region of interest on the basis of the selected intermediate image.

According to a second aspect of the invention, a computer program product comprising code instructions for the execution of the method for processing according to the first aspect of the invention is also proposed, when this program is executed by at least one processor.

According to a third aspect of the invention, a device for processing an acquired image showing a structured personal document belonging to an owner is also proposed, the device comprising:

determination means of a first character string from an automatic reading zone or of barcode type having a predetermined format and being different to the visual inspection zone, the first character string representing at least one portion of personalised information specific to the owner of the structured document, at least one processor configured to:

generating, from the first character string determined, an intermediate image showing a second character string representing the same personalised information as the first character string, detecting in the acquired image a third character string contained in the visual inspection zone, the third character string representing at least one portion of the same personalised information, the detection comprising an overall comparison of the intermediate image with a portion of the acquired image in the visual inspection zone, locating in the visual inspection zone a region of interest of the acquired image containing the third character string.

DESCRIPTION OF FIGURES

Other characteristics, aims and advantages of the invention will emerge from the following description which is purely illustrative and non-limiting and which must be considered with respect to the appended drawings, in which:

FIG. 4 illustrates a synthesis image generated during the processing method whereof the flowchart is illustrated in FIG. 3.

FIGS. 5 to 10 each illustrate side by side an acquired image showing the structured document illustrated in FIG. 2 and different portions of the synthesis image of FIG. 5, as well as matches of characters appearing in these two images.

In all figures, similar elements bear identical reference numerals.

DETAILED DESCRIPTION OF THE INVENTION

A/ Image Analysis System

Figure 1:
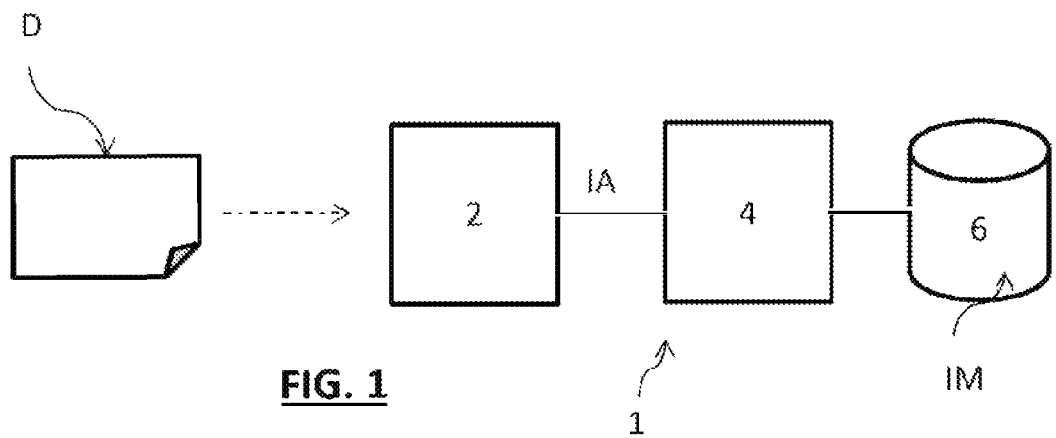
FIG. 1 illustrates a system for analysis of a structured document, according to an embodiment of the invention.

In reference to FIG. 1, an image-analysis system 1 comprises an image-acquisition device 2 and an image-processing device 4.

The image-acquisition device 2 is for example a camera.

The image-processing device 4 is adapted to process images IA acquired by the image-acquisition device. For this purpose, it comprises at least one processor adapted to execute algorithms for detection of predetermined content in images.

The system for analysis comprises also a memory 6. The memory 6 is for example included in the image-processing device 4. Alternatively, the memory 6 is hosted by a remote server with which the image-processing device 4 is capable of communicating via a network.

The memory 6 stores information for decoding an automatic reading zone MRZ having a predetermined format. In the present application, an "automatic reading zone" MRZ is to be interpreted as a zone on an official document reserved for reading, identification and validation of this document.

Information likely to be contained in an automatic reading zone MRZ is stored in particular in the memory 6.

The predetermined format of the MRZ is the format defined by the International Civil Aviation Organisation. This format is for example specified in document OACI/ICAO 9303 supplied by this organisation, or else that defined in the standard ISO/CEI 7501-1:2008.

Optionally, the memory 6 also stores at least one reference image IM showing a model of a structured document. The model contains predetermined regions of interest containing generic information, in the sense where this information is on any sample of structured document of a given type. For example, if the structured document is a French passport, a model relative to such a structured document stored in the memory 6 can comprise a region of interest containing the "first name:" character string. In a sample of a passport, another region containing the first name of the holder of the passport is connected to such a region of interest. This other region is personalised, in the sense where its content varies from one passport to the other; the content of a personalised region is therefore not referenced in the reference image IM.

All the same, it can be envisaged that a region of interest devoid of any characters, but whereof it is known that it is intended in practice to contain personalised content in a structured document, is predetermined in a reference image IM.

Also, the image-analysis system 1 can comprise a communication module with an electronic chip integrated into a structured personal document. Such electronic chips are found for example in recent-generation passports called "biometric passports". Such a communication module is known from the prior art. The communication module is for example a near field communication reader.

The analysis system 1 is for example a system for authentication of a structured document.

B/ Example of Structured Personal Document

In the present text, it is considered that a "structured personal document" designates a document belonging to a single owner and comprising a set of data organised in information category (field label) and personalised inputs: for example, it can be an identity piece serving to prove the civil status of its owner (identity card, driving licence, passport, etc.) or else an administrative document serving to prove that its owner has some rights (health insurance card, loyalty card, etc.).

Figure 2:
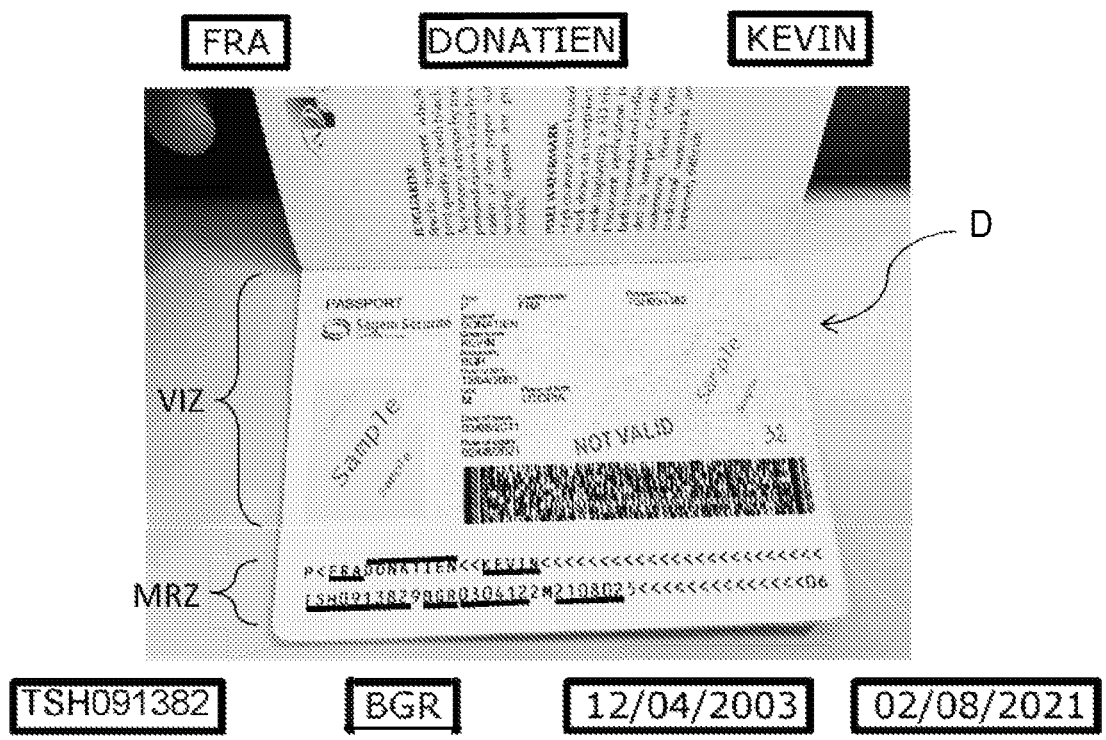
FIG. 2 illustrates a sample of a structured document.

FIG. 2 schematically illustrates a sample of a structured document D. This structured document is a demonstration passport.

On at least one of its two faces the structured document D comprises a lower part containing an automatic reading zone MRZ, and an upper part containing a visual inspection zone VIZ, whereof the content is non-coded, and therefore interpretable by anybody.

The automatic reading zone MRZ comprises a plurality of characters on a plain background. These characters are printed by means of a first font.

The plurality of characters of the MRZ comprises for example a string comprising the following characters:
"P", which is a type indicating that the structured document D is a passport,
"FRA", which is a geographic code indicating that document D relates to the French territory,
"DONATIEN", representing the family name of the owner of the structured document D,
"KEVIN", representing a first name of the owner of the structured document D,
"TSH091382" representing a unique identifier associated with the structured document D;
"BGR" representing a nationality of the owner;
"030412" representing a date of birth of the owner of document D (Dec. 4, 2003)
"210802" representing a date of expiration of document D (Feb. 8, 2021).

The automatic reading zone also contains characters separators (for example the character "<" for separating the type of the geographic code).

The visual inspection zone VIZ can comprise a photo of the legal owner of the structured document D, and a plurality of pairs of zones of interest. Each pair is constituted by a region of generic content and of a region of personalised content, that is, specific to the structured document (here specific to the owner of the passport).
A first pair of regions of interest is relative to the unique identifier of document D, constituted by:
  a generic region comprising the character string "PASSPORT NB/PASSPORT No."
  a personalised region comprising a character string representing the unique identifier of document D.
A second pair of regions of interest is relative to the family name of the owner of the structured document D, constituted by:
  a generic region comprising the character string "SURNAME/NOM"
  a personalised region comprising a character string representing the family name of the owner of document D.
A third pair of regions of interest is relative to the first name(s) of the owner of the structured document D, constituted by:
  a generic region comprising the character string "GIVEN NAMES/PRENOMS"
  a personalised region comprising a character string to one or several words, representing the or the first names of the owner,
A fourth pair of regions of interest is relative to the type of the structured document D, constituted by:
  a generic region comprising the character string "TYPE/TYPE"
  a personalised region comprising a character string representing the type of document D.
A fifth pair of regions of interest is relative to a geographic code associated with the structured document D, constituted by:
  a generic region comprising the character string "CODE/CODE"
  a personalised region comprising a character string representing the geographic code of document D.
A sixth pair of regions of interest is relative to a date of birth of the owner, constituted by:
  a generic region comprising for example the character string "date of birth", and
  a personalised region comprising a character string representing the date of birth of the owner (for example in the format "day/month/year")
etc.

The characters contained in the visual inspection zone VIZ are printed by way of at least one second font, which is not necessarily the same as the first font used for the MRZ. In the passport of FIG. 2, these two fonts are different, for example.

C/ The Image-Processing Method

It is supposed that a first image IA showing document D illustrated in FIG. 2 has been previously acquired by the image-acquisition device 2.

Figure 3:
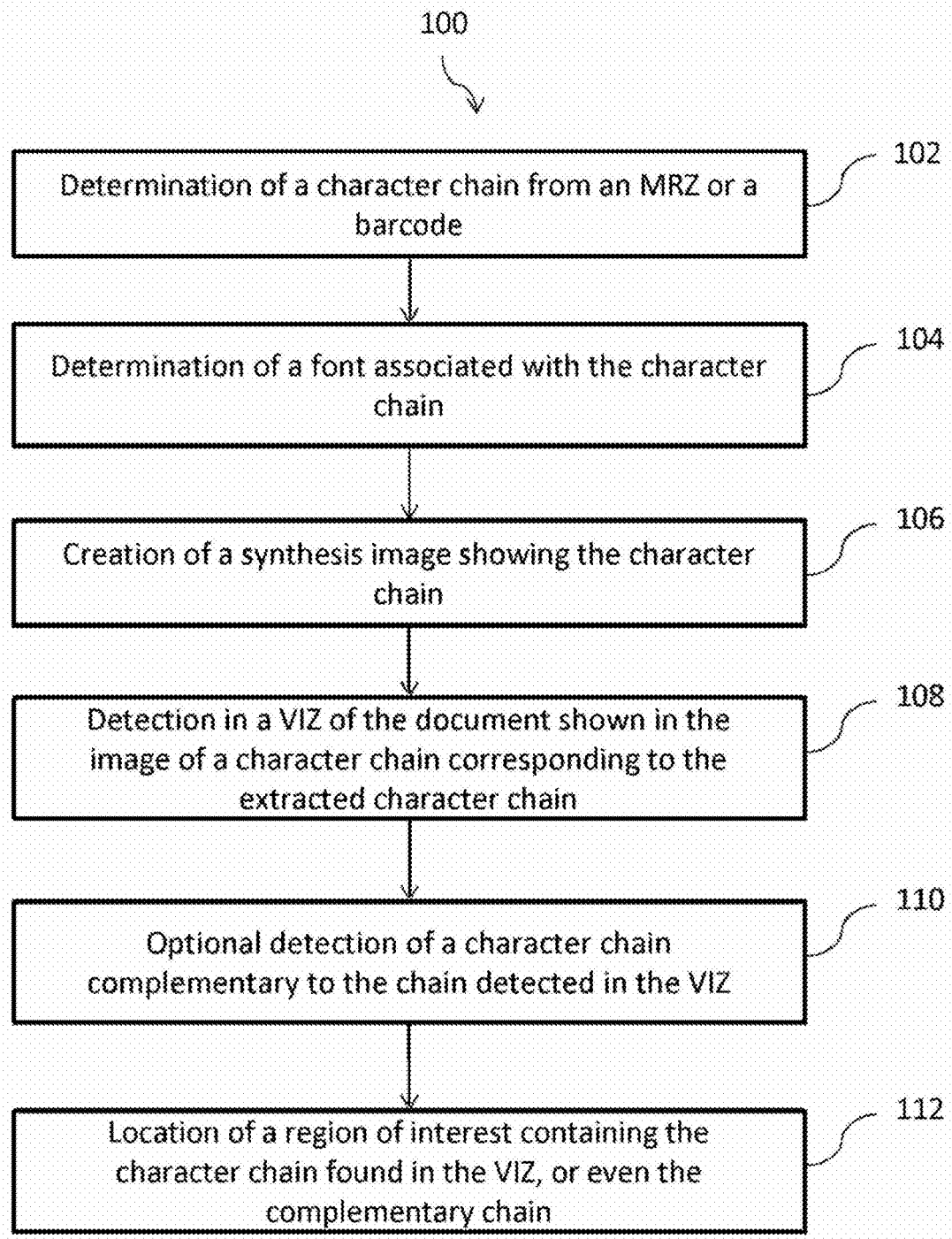
FIG. 3 is a flowchart of steps of an image-processing method, according to an embodiment of the invention.
Figure 6:
Figure 7:
Figure 8:

In reference to FIG. 3, a method 100 for analysis of this image IA comprises the following steps.

The image-processing device 4 locates the automatic reading zone MRZ in the first image IA. To conduct this step, the image-processing device 4 can for example take advantage of the fact that the first font is predetermined. In this case, the image-processing device 4 performs character recognition using this first font predetermined in the image.

The image-processing device then determines a first character string from the automatic reading zone (step 102).

The first character string can be directly contained in the automatic reading zone. This determination step 102 comprises extraction of the first character string contained directly in the automatic reading zone MRZ.

As a variant, the first character string may not be directly present in the automatic reading zone MRZ, and may instead be stored in a memory of an electronic chip integrated into the structured document D, the MRZ serving merely to access this character string stored in the chip. In such a variant, the determination step 102 can comprise the following steps:
  extraction in the acquired image of access data to the memory of the chip which are contained in the automatic reading zone,
  setting up a secure communications channel between the chip and a communication module of the image-analysis system 1 adapted for this purpose, by means of extracted access data,
  downloading the first character string stored in the memory of the chip to the communication module, then transmission of this character string to the image-processing device 4.

For example, the access data on the chip are constituted by 21 characters in an MRZ by counting in total 88: 9 characters representing a number of document D, 6 characters representing the date of birth of the owner and 6 characters representing the expiration date of the document.

The first character string illustrates at least one portion of personalised information specific to the owner of the structured document D of personal character, in the sense where this information is variable from one sample to the other of the same type of structured document since these samples belong to different owners. This personalised information can be for example information on the civil status of the owner of document D, such as a name or a first name, or else a unique identifier of the structured document (number of the document for example).

The first character string detected from the MRZ is "P". The predetermined format of the MRZ lets the image-processing device 4 determine this letter which designates the type of the structured document. The processing device 4 especially utilizes the fact that the first character string (here constituted by a single character) is immediately followed by the separator character predetermined (for example "<"), and that this first string is right at the start of the MRZ (first line, far left) to deduce that it illustrates a type of the structured document.

The image-processing device 4 then searches in the first image IA for a second character string representing the same personalised information specific to the structured document D as that of the first character string (step 108).

The image-processing device 4 can for example search for a second character string comprising the same characters as the first character string, or at least any of the corresponding characters (step 108).

In the present text, it is considered that:
- two characters representing the same letter accented variously are corresponding (for example "é" and "è" are corresponding),
- a character representing a letter accented and a character representing the same letter not accented are also corresponding (for example "é" and "e"),
- two characters representing the same letter according to two different cases (lower case, upper case, capital) are also corresponding,
- a character representing a sign in a first font and a character representing the same sign in a second font different to the first font are also corresponding.

More generally, it can be that the predefined format of the MRZ imposes limited use of a set of signs when being printed onto the structured document D. For example, the MRZ of the card illustrated in FIG. 2 cannot include an accented character. Also, the MRZ uses capital letters only. Also, during the search, care is taken to search not only a string comprising the same characters but also their accented variants, and their variants in lower case, if appropriate.

The search 108 is performed in the visual inspection zone VIZ of the structured document D, which is different to the automatic reading zone MRZ.

To make this search 108 easier when the first font used for the MRZ is different to the second font, used for the visual inspection zone VIZ, the image-processing device 4 determines what this second font (step 104) is.

This determination 104 of the second font typically comprises extraction of a geographic code contained in the automatic reading zone MRZ and searching in a database for a font associated with territory information. In the example of the FIG. 2, the geographic code is "FRA"; a font associated with French territory is therefore searched for.

Once the second font is determined during step 104, the image-processing device 4 generates a synthesis image IS showing the first character string, but this time printed by means of the second font determined, and not that shown in the starting image IA.

All or some of the characters of the MRZ are printed in the synthesis image IS using the second font. For example, some special characters not relative to personalised information are not printed in the synthesis image. This is the case for example of the character "<" which has simple function of information separator in the MRZ.

Then, during the search 108 the image-processing device 4 compares the synthesis image to a portion of the acquired image IA in the region of the VIZ.

This comparison can comprise matching points of interest of the synthesis image IS generated with points of interest present in the acquired image, in the visual inspection zone VIZ. This matching is especially facilitated by the fact that the fonts used in the VIZ and in the synthesis, image IS are the same. Rather than matching characters (which assumes having detected and segmented them, for example by means of a technique of OCR type), it can be possible to match points of interests of the synthesis image IS and points of interest in the visual inspection zone VIZ.

As a variant, the comparison used during step 108 uses a "template matching" technique for example as proposed in the following address http://www.lps.usp.br/hae/software/cirateg/index.html for locating the personalised fields searched for in the VIZ.

In this way, the character string "P" is found in the visual inspection zone VIZ of the card shown in FIG. 2, identical to the character string "P" initially found in the MRZ.

The image-processing device 4 locates a region of interest of the acquired image containing the second character string (step 112). This region of interest for example contains only this second character string with the exclusion of any other character string. In the present text, it is understood that a region of interest of the acquired image does not constitute a portion of this image.

The region of interest is typically a rectangular region.

Character recognition (OCR) can be executed in the located region of interest to extract the character string therefrom. Character recognition is preferably performed by using the knowledge of the font used for the region of interest of the VIZ, previously determined by the image-processing device 4, and/or the knowledge of the display format used in the region of interest, which improves the reliability of the character recognition performed in this way.

In the event where different fonts and/or display formats are used in the VIZ or where such information is unknown beforehand, it is possible to generate several synthesis images IS. Each synthesis image IS shows the first character string in a specific form, for example printed by means of a font and/or a determined display format as being used in the VIZ or not. It is possible to generate as many synthesis images as fonts of the VIZ, display formats of the VIZ, or font couples and display formats of the VIZ.

Each one of the synthesis images IS generated is compared to a portion of the acquired image in the region of the VIZ. A matching index can be calculated for each of the comparisons made. This matching index is all the higher since the match between the synthesis image IS shown in the given font and/or the display format, and the portion of the acquired image is good. The synthesis image IS procuring the highest matching index is selected to be OCR-processed in the font and/or the display format to which it corresponds.

The above steps can be repeated for several different character strings extracted from the MRZ.

It has been evident previously that a character string representative of a geographic code (here "FRA") has been extracted from the MRZ. The same character string is found in the visual inspection zone VIZ.

Similarly, the family name "DONATIEN" is detected in the MRZ. The corresponding character string "DONATIEN" is detected in the visual inspection zone VIZ.

The first name "KEVIN" is also detected in the MRZ. The corresponding character string "KEVIN" is detected in the visual inspection zone VIZ.

The above steps are also repeated for a unique identifier of the structured document. In the case of document D, the identifier "TSH091382" is extracted from the MRZ, found to the far left of the second line of the MRZ; the same identifier is detected in the visual inspection zone VIZ.

The above steps can also be repeated for a date of birth and a place of birth of the owner of document D, as well as a date of expiration of document D.

In the case of the date of birth, it can be that a character string having a certain meaning in the automatic reading zone MRZ and the character string having the same meaning in the visual inspection zone VIZ have different formats. The character string "870312" can be found for example in the MRZ and the corresponding character string "13/03/1987" in the VIZ which are both representative of a date of birth of Mar. 12, 1987.

When these two formats are different, the character string found in the MRZ is transcoded in the same format as that used in the visual inspection zone prior to the execution of step 112.

When the steps of the method 100 are repeated for several character strings detected in the MRZ, several separate regions of interest are located in the acquired image IA.

In the example illustrated in FIG. 2, the MRZ contains no missing information. In particular, the first name "KEVIN" and the name "DONATIEN" are sufficiently short to fit fully in the MRZ.

However, it can be that some information, fully present in the visual inspection zone VIZ, is present in the MRZ under a shortened form only.

Assume for example that the owner of the passport of FIG. 2 has "ALEXANDRE" as second first name and that this second first name is printed in full in the visual inspection zone VIZ to the right of the first name "KEVIN", but that this second first name is not at all present in the MRZ due to lack of space. If the intent is to conduct the above steps, the characters "Alexandra" present in the visual inspection zone VIZ will not be included in a located region of interest. But such inclusion would be advantageous as it would enrich the region of interest in terms of amount of personalised information. It will be evident hereinbelow that the different uses which can be made regions of interest located during the step 112 take advantage of this information enrichment.

For this, the image-processing device 4 can search (step 110) for any presence of a complementary character string, near a character string found in the visual inspection zone VIZ during step 108. The relevant vicinity is for example a region adjacent to the character string detected, located downstream of the latter by reference to a reading direction of the character string. So, when the Latin alphabet is used, the reading direction is from left to right; "downstream" means located to the right of the character string detected.

In a first variant of the step 110, the search is limited to searching for complementary letters of a word whereof the string initially found in the visual inspection zone VIZ forms part. In other words, it stops as soon as the end of a word is detected (for example by detecting a blank character).

In a second variant of the step 110, the search extends to the edge of the structured document located downstream of the string found during the detection step 108. In this case, the complementary character string "ALEXANDRE" is found.

When a complementary character string has been found during the step 110, the located region of interest during step 112 a portion of the acquired image contains not only the string found during the detection step 108 but also the complementary character string corresponding. Therefore, in the example mentioned previously, a region of interest can comprise "KEVIN, ALEXANDRE", and not only "KEVIN".

FIGS. 5 to 10 show the matches made by the image-processing device between the images IA and IS, respectively for character strings representative of the following information: geographic code, family name, first name, unique identifier of document, nationality, date of birth.

On completion of the execution of the method 100, one or more regions of interest have been located in the acquired images; these regions of interests can be separate.

The or each region of interest can be used in various ways.

D/ Creation or Updating of a Reference Image Showing a Structured Document Model The or each located region of interest can serve to enrich or create from all pieces a reference image showing a model of a structured document.

Such a reference image typically serves to be compared to at least one acquired image of a structured document, for authentication purposes.

The image-processing device 4 includes each located region of interest in a reference image IM intended to serve as model for the structured document. Inclusion means a copy of pixels of the image IA in a reference image IM.

In a first variant, the processing device creates a new reference image IM including the pixels of each located region of interest in the image IA.

In a second variant, the device includes each region of interest in a reference image IM pre-existing in the memory 6; this reference image IM is enriched with the additional information contained in this portion of image.

The reference image IM (created or updated) is stored in the memory 6.

This reference image IM comprises not only generic regions of interest but also personalised regions of interest of the visual inspection zones, containing for example the unique identifier of document D, the geographic code of document D, the family name of the owner of document D, and its first name(s).

Also stored in the memory 6 is location information of each region of interest in the reference image IM.

E/ Classification

It can be that the memory 6 contains several pre-existing reference images, showing models of different documents of types (passport, card identity, etc.). In this case it has to be determined which of these reference images must be enriched with the regions of interests which have been located by the method 100.

The following steps are taken to select a pertinent reference image.

On the basis of the predetermined format of the automatic reading zone MRZ the image-processing device 4 detects the meaning of personalised information contained in a located region of interest. For example, as indicated previously, the image-processing device 4 has determined that the first letter "P" of the MRZ designates the type of the structured document because of this letter and proceeds the same way as for other information consigned in the MRZ.

It is also supposed that each of the reference images contains an empty region of interest in practice intended to contain personalised information in a structured document, the meaning of this personalised information being predetermined. For example, data for knowing that a small zone of interest devoid of any character of the image IM are stored in the memory 6, located below the generic region containing "TYPE/TYPE", is intended to host, in a true structured document, a character string designating the type of this structured document.

If the image-processing device 4 confirms that the personalised region of interest containing the character "P", located in the acquired image, has a size and/or a position near a region of interest vide of a reference image, this reference image is selected. This reference image is then enriched with the content of the region of interest previously located in the acquired image (here the character "P").

From the reference images stored in the memory 4, the image-processing device eventually selects a reference image as a function of the meaning of the personalised information and as a function of the placement and/or dimensions of the located region of interest.

F/ Video Monitoring

The image-processing device can also utilise a region of interest for video monitoring purposes.

Figure 9:
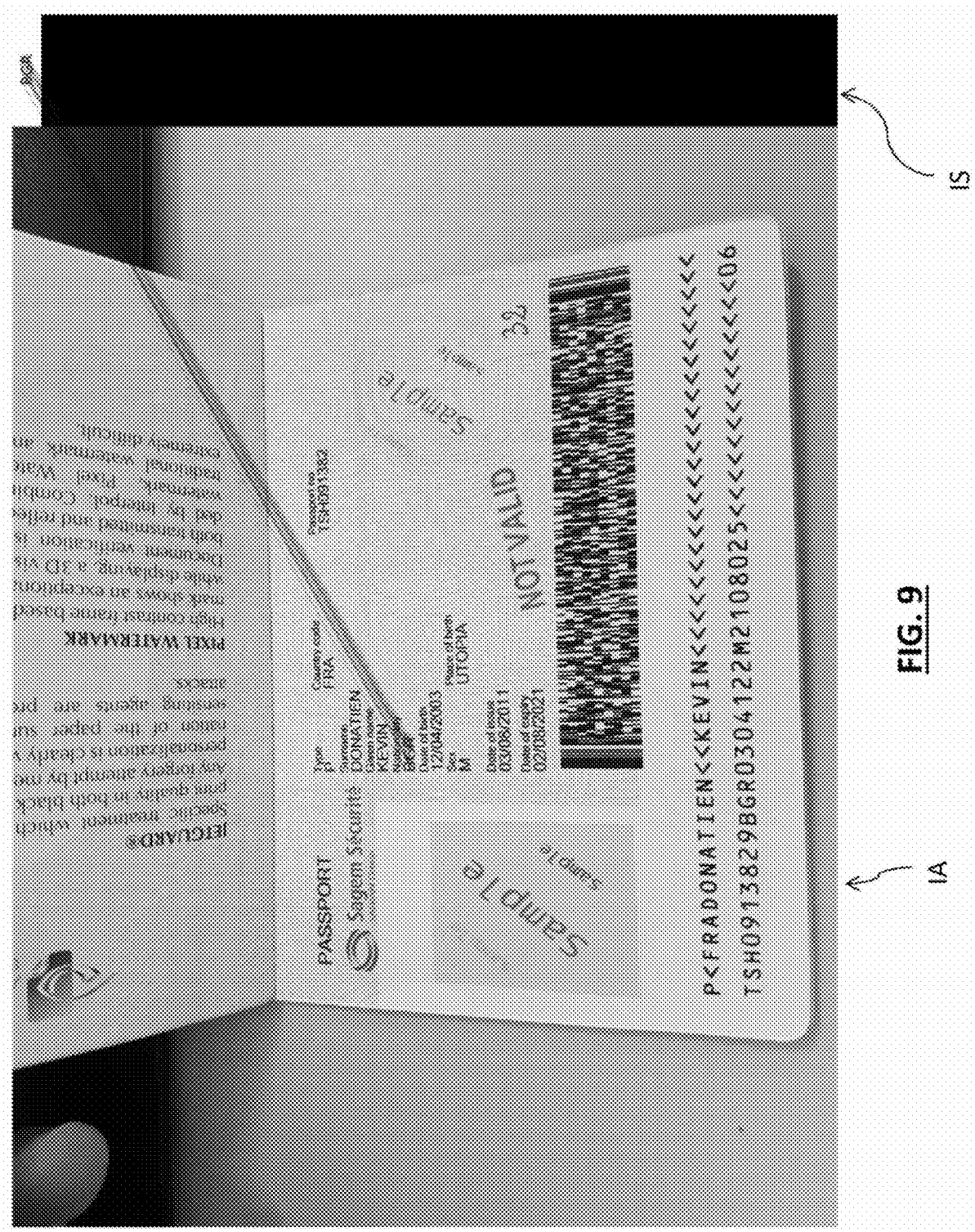
Figure 10:

In reference to FIG. 9, the acquisition device 2 acquires at least one second image showing the structured document (step 200). For example, the first acquired image IA and the second acquired image for example form part of a same video sequence filmed by the image-acquisition device 4.

The image-processing device runs a video tracking algorithm; this algorithm being selectively applied to the or each region of interest determined in the first image once.

The image-processing device 4 matches regions of the first image IA with regions of the second acquired image, according to a method known from the prior art (step 300).

In this application of video monitoring, the or each located region of interest constitutes a source of information for significantly increasing the zone covered by the matches. However, it should be noted that video monitoring is not applied to all the pixels of the acquired images but is limited solely to those pixels of located regions of interest, which offers a good compromise between efficacy of video monitoring and economy of calculation load.

The image-processing device can also match regions of a reference image IM created or enriched on the basis of regions of interest located in the image IA, with regions of interest of another acquired image.

The reference image IM created or updated by means steps of the method 100 therefore executes matching more precise than a conventional reference image IM showing a generic model (that is, containing predetermined regions of interest containing generic information shared by several samples of the same type of structured document), comparatively less rich in information.

The image-processing device 4 can also estimate geometric transformation given deformations of the structured document shown in the second image relative to the model, from matches made. Such estimation tracks the structured document even when the latter has undergone deformations (folds, wrinkling, etc.) (step 400). The estimation of this geometric transformation can for example be executed by means of one of the methods cited in the French patent application having registration number 1559476.

The enriched character of the reference image IM used here more precisely characterizes such deformations, compared to a generic reference image IM.

This video monitoring (or more generally the enriched reference image IM) can be used during an authentication process of structured document.

G/ Other Embodiments

Embodiments in which the automatic reading zone MRZ and the visual inspection zone VIZ are included in the same structured personal document D have been previously, and wherein the determination steps of a first character string from the MRZ and detection of a second character string in the visual inspection zone VIZ are conducted in the same image IA.

As a variant, the determination step 102 is performed on the basis of an extraction image different to the image IA, the extraction image showing the MRZ.

Figure 11:
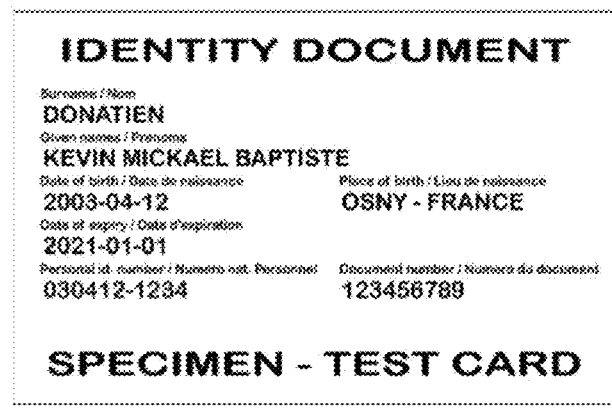
FIG. 11 illustrates a sample of an identity document having no automatic reading zone.
Figure 12:
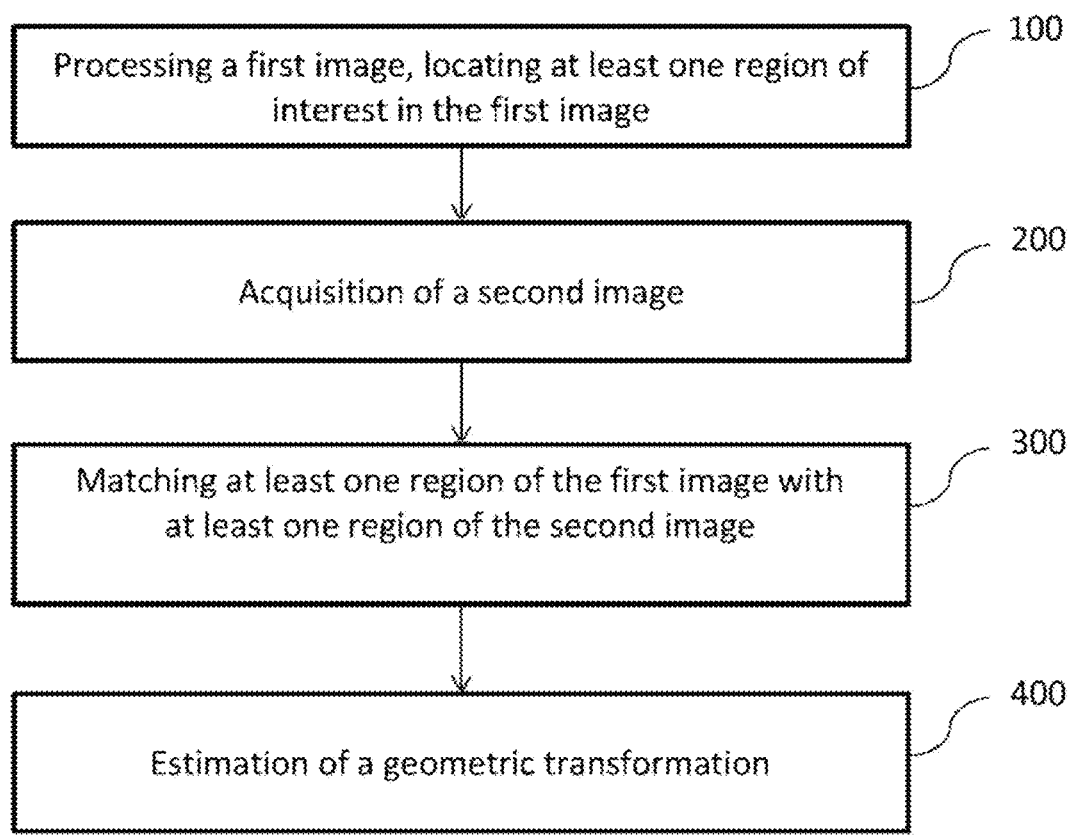
FIG. 12 is a flowchart of steps of a monitoring method of a structured document in a video sequence, according to an embodiment of the invention.

Also, the extraction image can show the same structured personal document D, or else another structured personal document belonging to the same owner as document D. In this case, document D cannot comprise an MRZ (FIG. 11 shows an example of structured personal document having no MRZ). For example, the determination step 102 can be conducted on the basis of an extraction image showing document D, which is a passport, and the detection step 108 be conducted on a health insurance card belonging to the same owner.

Also, the invention still applies to documents comprising a barcode rather than an automatic reading zone MRZ whereof the format has been defined by the International Civil Aviation Organisation. Such a barcode is for example the 2D-doc barcode proposed in France by the National Agency for Secure Documents.

The invention is for example applicable to a barcode of a boarding pass whereof the format is defined by the International Air Transport Association (IATA) in the document entitled "Simplifying the Business Bar Coded Boarding Pass Implementation Guide". In practice, the separate processing events of a boarding pass and a passport are very current during air travel. Reading the barcode of the boarding pass is easier than reading an identity document: it is therefore advantageous to exploit the barcode of a boarding pass as information source for locating regions of interest in the VIZ of the identity document.

The invention claimed is:
1. A method for processing an acquired image showing a structured personal document belonging to an owner, the structured personal document comprising a visual inspection zone, the method comprising:
determining a first character string from an automatic reading zone or of barcode type having a predetermined format and being different to the visual inspection zone, wherein the first character string represents at least one portion of a personalised information specific to the owner of the structured document, generating, from the first character string determined, an intermediate image showing a second character string representing the same portion of personalised information, detecting in the acquired image a third character string contained in the visual inspection zone, the third character string representing at least one portion of the same personalised information, the detection comprising a comparison of the intermediate image with a portion of the acquired image in the visual inspection zone, locating in the visual inspection zone a region of interest of the acquired image containing the third character string, the method further comprising performing a character recognition in the located region of interest, comprising:

repeating the generating step from the first character string so as to obtain several intermediate images showing the second character string representing the same portion of personalized information but under different predetermined representations, repeating the detecting and locating steps for each intermediate image generated, for each intermediate image, estimating a matching index between the intermediate image and located region of interest, selecting the intermediate image for which a maximal matching index has been estimated from the estimated matching indices, performing the character recognition step selectively in the located region of interest on the basis of the selected intermediate image.

2. The method according to claim 1, wherein determining the first character string comprises extracting, from an extraction image showing the automatic reading zone or of barcode type, the first character string, wherein the first character string is contained in the automatic reading zone or of barcode type.

3. The method according to claim 2, wherein the structured personal document comprises the automatic reading zone or of barcode type, and wherein the extraction image is an acquired image showing the structured personal document.

4. The method according to claim 2, wherein the extraction image is the acquired image where detection is executed.

5. The method according to claim 1, wherein:
the structured personal document comprises an electronic chip storing the first character string,
determining the first character string comprises: extracting, from an extraction image showing the automatic reading zone or of barcode type, access data to the electronic chip contained in the automatic reading zone or of barcode type; and accessing to the first character string stored in the electronic chip using the extracted access data.

6. The method according to claim 1, comprising determination of a font used in the visual inspection zone to represent the portion of personalised information, and wherein the intermediate image is generated so as to show the second character string in the determined font, wherein determination of the font comprises the sub-steps of:
extraction of information from the automatic reading zone or of barcode type,
searching in a database for a font associated with the extracted information.

7. The method according to claim 1, comprising the determination of a display format used in the visual inspection zone to represent the portion of personalised information, and wherein the generation of the intermediate image comprises a transcoding of the first character string to the determined display format.

8. The method according to claim 1, wherein
the first character string illustrates a first portion of the personalised information,
a complementary character string representing another portion of the personalised information is detected near the third character string in the acquired image,
the region of interest of the located acquired image also contains the complementary character string.

9. The method according to claim 1, further comprising:
detecting a meaning of the personalised information from the predetermined format of the automatic reading zone or of barcode type,
selecting a reference image in a database of reference images showing models of structured documents wherein said reference image is selected using the meaning of the personalised information and using a location and/or dimensions of the located region of interest.

10. The method according to claim 1, further comprising creating or updating a reference image showing a model associated with the structured personal document, wherein the region of interest of the acquired image is included in the reference image.

11. The method according to claim 1, further comprising executing a video tracking algorithm confined to the located region of interest in the acquired image, so as to selectively monitor the content of the region of interest in a video sequence comprising the acquired image.

12. A non-transitory computer program comprising code instructions for the execution of an analysis method according to claim 1, when said non-transitory computer program is executed by at least one processor.

13. A device for processing an acquired image showing a structured personal document belonging to an owner, wherein the device comprises:
means for determining a first character string from an automatic reading zone or of barcode type having a predetermined format and being different to the visual inspection zone, the first character string representing at least one portion of personalised information specific to the owner of the structured document,
at least one processor configured to:
generate, from the first character string determined, an intermediate image showing a second character string representing the same personalised information as the first character string,
detect in the acquired image a third character string contained in the visual inspection zone, the third character string representing at least one portion of the same personalised information, the detection comprising a comparison of the intermediate image with a portion of the acquired image in the visual inspection zone,
locate in the visual inspection zone a region of interest of the acquired image containing the third character string,
means for performing a character recognition in the located region of interest, comprising:
repeating the generating step from the first character string so as to obtain several intermediate images showing the second character string representing the same portion of personalized information but under different predetermined representations, repeating the detecting and locating steps for each intermediate image generated,
for each intermediate image, estimating a matching index between the intermediate image and located region of interest,
selecting the intermediate image for which a maximal matching index has been estimated from the estimated matching indices,
performing the character recognition step selectively in the located region of interest on the basis of the selected intermediate image.

* * * * *